Patented July 11, 1950

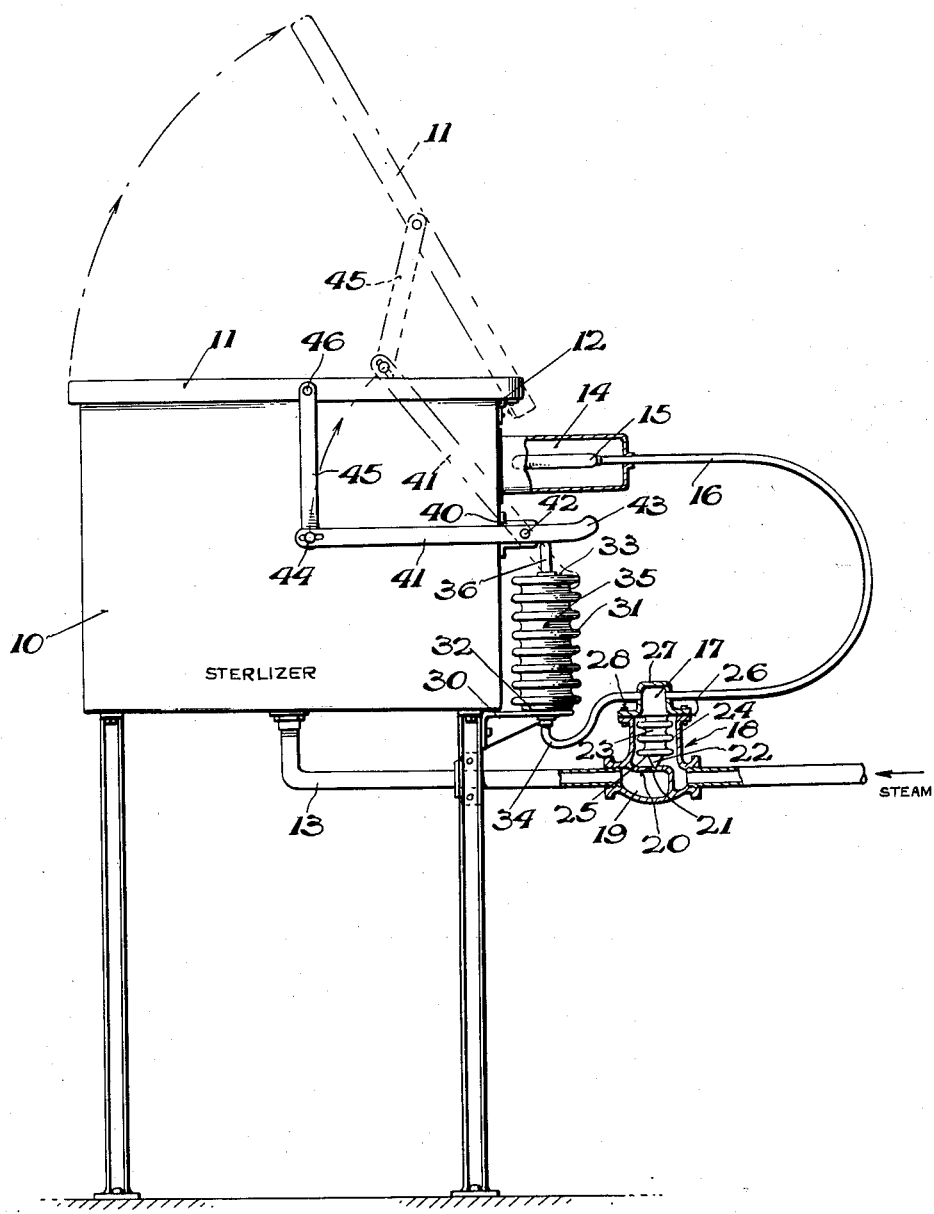

2,515,019

UNITED STATES PATENT OFFICE 2,515,019

TEMPERATURE REGULATOR AND SAFETY DEVICE FOR STERILIZERS

Robert P. Saunders, Knoxville, Tenn., assignor to Robertshaw-Fulton Controls Company, Knoxville, Tenn., a corporation of Delaware Application March 1, 1948, Serial No. 12,306

7 Claims. (Cl. 236—1)

This invention relates to a combined temperature regulator and safety device, and more particularly to a device of the type characterized which is particularly applicable to sterilizers, such as sterilizers for surgical instruments and the like, although capable of wider application as will be apparent to those skilled in the art.

It has heretofore been proposed to provide a sterilizer with means automatically operable by the opening of the means of access to the sterilizer for discontinuing the flow of steam to the sterilizer chamber. Thermostatic controls have also been proposed for regulating the flow of heating medium to a sterilizer to maintain a substantially predetermined temperature therein.

It is an object of this invention to provide a single unit which performs both of the functions of temperature regulation and safety control.

Another object of this invention is to provide a device of the type characterized which can readily be applied to sterilizers in service as well as readily incorporated in new sterilizer installations.

Another object of this invention is to provide a device of the type characterized which is simple in construction, composed of parts which are simple and inexpensive to manufacture, assemble and install, and which is certain and efficient in operation.

Other objects will appear as the description of the invention proceeds.

The invention is capable of receiving a variety of expressions only one of which is illustrated on the accompanying drawing, and it is therefore to be expressly understood that the drawing is for purposes of illustration only, and is not to be construed as a definition of the limits of the invention, reference being had to the appended claims for that purpose.

The accompanying drawing shows rather diagrammatically a combined temperature regulator and safety device embodying the present invention.

Referring in detail to the accompanying drawing, 10 designates a sterilizer of any suitable type, size and construction, the same being shown as of the type wherein a closure member in the form of a cover 11 is hinged to the body of the sterilizer at 12 for gaining access to the interior thereof. As will be apparent to those skilled in the art, however, the present invention can be readily adapted to other forms of sterilizers having other provisions for gaining access thereto. As illustrated, the sterilizer has a steam pipe 13 through which steam is conveyed to the interior of the sterilizer where it may be used in a heating coil, delivered as a heating medium to the liquid therein or provide a steam bath within the sterilizer. As the details of the sterilizer itself constitute no part of the present invention, further description of the details thereof is deemed unnecessary.

In sterilizers where a thermostatic control of the flow of steam is desired, it is preferable to install the controlling element of the thermostat in a chamber to one side of but in communication with the sterilizing chamber so as to dispose said controlling element where it will not interfere with the ready introduction and withdrawal of instruments to and from the sterilizing space. It is also preferred to subject the controlling element to the vapor of the sterilizing liquid so that the rate of vaporization can be controlled. When the closure member for the opening through which access is gained to the sterilizing chamber is open with such an arrangement, said controlling element is out of the path of the vapors which escape from the sterilizing chamber through said opening, whereby the temperature of said controlling element is likely to be lowered and thereby cause the thermostat to respond and open the steam valve. Thus live steam may escape through the opening from the sterilizing chamber, possibly scalding the attendant or at least possibly interfering with the safe introduction or withdrawal of the instruments which have been or are to be sterilized. The present invention provides a safety device in association with a temperature control, forming a unit therewith, whereby the steam valve is positively closed when the closure member is open.

Referring in detail to the accompanying drawing, the sterilizer is shown as provided in any suitable way with a chamber 14 in communication with the interior or heated chamber of the sterilizer so as to be filled with the fluid therein at the temperature within the sterilizing space. Mounted in said chamber 14 in any suitable way is a bulb 15 with which communicates a tube 16, of any suitable length and construction, that leads from said bulb 15 to a chamber 17 associated with the valve mechanism, generally designated 18, in the line of the heating medium, usually steam.

As here shown, the valve mechanism 18 includes a housing 19 provided interiorly with a partition 20 in which is located any suitable valve port 21. A valve member 22 of any suitable construction is positioned for cooperation with said valve port 21 and connected in any suitable way with the movable end wall of an expansible and collapsible chamber 23, here shown as formed interiorly of an expansible and collapsible corrugated tubular wall or bellows 24 having, integrally connected thereto or suitably attached thereto, a movable end wall 25 to which the valve member 22 is attached or on which it is mounted. Bellows 24 is mounted in the housing 19 in any suitable way, being shown as provided with a flange 26 at its open end by which it is clamped to the housing, with interposed packing if desired, by a bonnet member 27 within which is formed the chamber 17. Bonnet member 27 and housing 19 are shown as flanged and secured together by bolts and nuts at 28. The before-mentioned tube 16 is secured in any suitable way in an aperture in the bonnet member 27 so as to be in open communication with the chamber 17 therein, and said chamber in turn is in communication with and forms an extension of the expansible and collapsible chamber 23.

Also mounted on the sterilizer in any suitable way, as by a bracket 30, is a second expansible and collapsible chamber 35, here shown as formed interiorly of an expansible and collapsible corrugated tubular wall or bellows 31 having a stationary end wall 32 secured to the bracket in any suitable way and a movable end wall 33 formed integrally therewith or suitably attached thereto. A pipe 34 of any suitable length and construction is secured to the stationary end wall 32 in open communication with the chamber 35 within the bellows 31, and its opposite end is secured in any suitable way in an aperture in the bonnet member 27 so as also to be in open communication with the chamber 17. Mounted on the movable end wall 33 of chamber 35 is a suitable post 36 for compression of the chamber 35 as hereinafter explained, expansion of said chamber being effected either by the inherent resiliency of the bellows 31 or by any suitable spring associated therewith.

Pivotally mounted on the sterilizer in any suitable way, as by a bracket 40, is a lever 41 pivoted to the bracket at 42 and disposed in alignment with the post 36, the end 43 of said lever, if desired, being given a somewhat arcuate shape to facilitate wiping contact with the end of the post 36. The opposite end of the lever 41 is pivotally connected, preferably through a pin and slot connection at 44, to a link 45 which in turn is pivoted to the cover 11 at 46.

Bulb 15, together with its tube 16, is charged with any suitable vaporizable liquid which upon injection into the chamber 17, 23 will vaporize in chamber 23 under the heat of the steam flowing through the valve housing 19 and thereby effect expansion of the chamber 23 and closure of the port 21 by the valve member 22. Expansible and collapsible chamber 35 is also charged with the same vaporizable liquid so that upon compression of said chamber 35 liquid therefrom will be forced into the chamber 17, 23 and also by vaporization in the chamber 23 effect closure of the port 21 by the valve member 22.

In operation, steam flows through the conduit 13 into the sterilizing chamber, passing through the port 21 in the housing 19 and surrounding the expansible and collapsible chamber 23. As long as the temperature in said sterilizing chamber is below that desired for the sterilizing action the temperature at the bulb 15 is not sufficient to effect injection of the vaporizable liquid from the tube 16 into the chamber 17. As soon as the temperature in the sterilizing chamber rises above that to be maintained therein, however, the vaporizable liquid in the bulb 15, by reason of its expansion, effects an injection of said vaporizable liquid from the end of the column in the tube 16 into the chamber 17, whence it passes into the chamber 23 where, under the temperature of the steam surrounding the same, it vaporizes and expands the chamber 23 to cause the valve member 22 to close the port 21. Conversely, a drop in temperature at the bulb 15 causes a contraction of the vaporizable liquid therein with a resultant decrease of pressure in the chamber 23 whereby the valve member 22 is opened to permit flow of steam. Thereby the valve member 22 is adjusted in conformity with the temperature of the bulb 15 so as to maintain the desired sterilizing temperature in the heated chamber of the sterilizer.

When sterilization has been effected and the instruments are to be removed, lifting of the cover 11 to gain access to the instrument causes the link 45 to pivot the lever 41 around its axis 42, whereby the end 43 wipes across the end of the post 36, depressing said post and the movable end wall of the chamber 35 to contract the latter chamber and thereby force vaporizable liquid therefrom into the chamber 17 where it passes into the chamber 23 and, under the heat of the steam, vaporizes to cause the valve member 22 to close the port 21. By appropriately constructing end 43 of the lever the post 36 may be depressed sufficiently so that the injection of liquid into chamber 17, 23 is adequate to hold the valve closed for any reasonable period during which the cover is open. When said cover is closed, however, the lever 41 is moved to the full line position shown in the drawing, whereupon the chamber 35 expands by inherent resilience of the bellows 31 or by the action of any suitable spring associated therewith to retain the end of the post 36 in contact with the end 43 of said lever 41. Such expansion of the chamber 35 reduces the pressure in the chamber 35 whereby the chamber 23 contracts to withdraw the valve member 22 from the port 21, readmitting steam to the sterilizing chamber. Thereupon the bulb 15 resumes control of the valve member 22, said valve member remaining open until the temperature in the sterilizing chamber, by action on the bulb 15, effects closure of the valve member 22.

It will therefore be perceived that the present invention provides a unitary device which incorporates both a temperature control and a safety control. The single chamber 17, 23 operates as a vaporizing chamber both for the temperature control including the bulb 15 and tube 16 and for the safety device including the expansible and collapsible chamber 35. Thereby a simple, but highly effective device, has been provided which assures the maintenance of the desired temperature within the sterilizing space when the closure member thereof is closed while at the same time assuring that steam will not flow into the sterilizing space when said closure member is open. The combined temperature regulating and safety device is composed of relatively simple parts that are easy to manufacture, assemble and install and the device is one which can be readily applied to sterilizing installations already in service as well as incorporated in a sterilizer as originally supplied.

While the embodiment of the invention illustrated on the drawing has been described with considerable particularity, it is to be expressly understood that the invention is not limited thereto, as the same may receive a variety of mechanical expressions, changes may be made in the details of construction, arrangement, proportion, etc., of parts, parts may be replaced by equivalent parts, etc., without departing from the present invention. While the invention has been illustrated as applied to a sterilizer having a closure member in the form of a cover, it is apparent that the invention may be readily adapted by those skilled in the art to sterilizers having other forms of closure member. Furthermore, while the invention has been illustrated as applied to a sterilizer for surgical instruments and the like, it is apparent that it is of wider utility and may be used in other installations wherein a heated chamber is provided with a temperature control but flow of heating medium to said chamber is to be prevented whenever a closure member is open. Reference is therefore to be had to the appended claims for a definition of the invention.

What is claimed is:

1. In a device of the character described having means providing a heated chamber, a closure member therefor, a conduit for conveying heating medium thereto and valve mechanism in said conduit for controlling the flow of heating medium, a unitary device for controlling said valve mechanism including a single expansible and collapsible chamber operatively connected to the valve and subjected to the temperature of the heating medium to provide a vaporizing chamber, temperature responsive means subjected to the temperature in said heated chamber for injecting a vaporizable liquid into said expansible and collapsible chamber, a second expansible and collapsible chamber for injecting vaporizable liquid into said first named expansible and collapsible chamber, and means operable by said closure member for actuating said second expansible and collapsible chamber.

2. In a device of the character described having means providing a heated chamber, a closure member therefor, a conduit for conveying heating medium thereto and valve mechanism in said conduit for controlling the flow of heating medium, a unitary device for controlling said valve mechanism including a single expansible and collapsible chamber operatively connected to the valve and subjected to the temperature of the heating medium to provide a vaporizing chamber, a bulb having means of communication with said expansible and collapsible chamber and subjected to the temperature in said heated chamber, said bulb and communication means being charged with a vaporizable liquid for injection into said chamber upon expansion of the liquid in said bulb, a second expansible and collapsible chamber charged with said vaporizable liquid and having means of communication with said first named expansible and collapsible chamber, and means operable by said closure member for actuating said second expansible and collapsible chamber to inject vaporizable liquid therefrom into said first named expansible and collapsible chamber.

3. In a device of the character described having means providing a heated chamber, a closure member therefor, a conduit for conveying heating medium thereto and valve mechanism in said conduit for controlling the flow of heating medium, a unitary device for controlling said valve mechanism including a single expansible and collapsible chamber operatively connected to the valve and subjected to the temperature of the heating medium to provide a vaporizing chamber, means for injecting a vaporizable liquid into said chamber including means responsive to the temperature in said heated chamber and operable upon rise of temperature to force vaporizable liquid into said expansible and collapsible chamber, and means for closing said valve if open upon opening of said closure member including a second source of vaporizable liquid in communication with said expansible and collapsible chamber and means operable by the opening of said closure member for actuating said second source and injecting vaporizable liquid from said second source into said expansible and collapsible chamber.

4. In a device of the character described having means providing a heated chamber, a closure member therefor, a conduit for conveying heating medium thereto and valve mechanism in said conduit for controlling the flow of heating medium, a unitary device for controlling said valve mechanism including a single expansible and collapsible chamber operatively connected to the valve, and alternative means for actuating said expansible and collapsible chamber and thereby said valve including means providing two sources of thermosensitive fluid in communication with said expansible and collapsible chamber, one of said sources being subjected to the temperature in said heated chamber, and means operatively connected with said closure member and cooperating with the second source of vaporizable liquid for effecting actuation of said expansible and collapsible chamber from said second source.

5. In a device of the character described, means providing a heated chamber, a closure member therefor, a conduit for conveying heating medium thereto and valve mechanism in said conduit for controlling the flow of heating medium, a unitary device for controlling said valve mechanism including a single expansible and collapsible chamber operatively connected to the valve and subjected to the temperature of the heating medium to provide a vaporizing chamber, and two means for actuating said expansible and collapsible chamber and thereby said valve including two sources of vaporizable liquid in communication with said expansible and collapsible chamber, one of said sources including a container for said liquid subjected to the temperature in said heated chamber, the other of said sources including an expansible and collapsible chamber, and means operatively connected to said closure member for actuating said last named chamber to inject liquid into said first named expansible and collapsible chamber.

6. In a device of the character described, means providing a heated chamber, a closure member therefor, a conduit for conveying heating medium thereto and valve mechanism in said conduit for controlling the flow of heating medium, a unitary device for controlling said valve mechanism including a single expansible and collapsible chamber operatively connected to the valve and subjected to the temperature of the heating medium to provide a vaporizing chamber, two sources of vaporizable liquid in communication with said expansible and collapsible chamber, one of said sources including a bulb subjected to the temperature in the heated chamber and containing said liquid, the other of said sources including an expansible and collapsible chamber, and means for closing said valve if open under the control of the first referred to source including means operatively connected to said closure member for actuating said second named expansible and collapsible chamber upon opening of said closure member and ejecting liquid into said first named expansible and collapsible chamber.

7. In a device of the character described, means providing a heated chamber, a closure member therefor, a conduit for conveying heating medium thereto and valve mechanism in said conduit for controlling the flow of heating medium, a unitary device for controlling said valve mechanism including a single expansible and collapsible chamber operatively connected to the valve and subjected to the temperature of the heating medium to provide a vaporizing chamber, two sources of vaporizable liquid in communication with said expansible and collapsible chamber, one of said sources including a bulb and tube in communication with said expansible and collapsible chamber and charged with said vaporizable liquid, said bulb being subjected to the temperature in said heated chamber, the other of said sources including an expansible and collapsible chamber charged with said vaporizable liquid and having means of communication with said first named expansible and collapsible chamber, and means for operating said second named expansible and collapsible chamber for injecting liquid into said first named expansible and collapsible chamber and including mechanical means operatively connected to said closure member and associated with said second named expansible and collapsible chamber for compressing said last named chamber upon opening of said closure member.

ROBERT P. SAUNDERS.

REFERENCES CITED

The following references are of record in the file of this patent:

UNITED STATES PATENTS

| Number | Name | Date |
| --- | --- | --- |
| 816,046 | Serrell | Mar. 27, 1906 |
| 2,093,693 | Dillman | Sept. 21, 1937 |
| 2,318,875 | McAnlis | May 11, 1943 |